United States Patent
Harry et al.

(10) Patent No.: US 10,166,469 B2
(45) Date of Patent: Jan. 1, 2019

(54) PERSISTENT GAME SESSIONS WITH MULTIPLAYER SUPPORT

(71) Applicant: Apple Inc., Cupertino, CA (US)

(72) Inventors: Ben Harry, Cupertino, CA (US); Johnny Trenh, San Jose, CA (US); Megan Gardner, Redwood City, CA (US); Alan Berfield, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 75 days.

(21) Appl. No.: 15/179,795

(22) Filed: Jun. 10, 2016

(65) Prior Publication Data

US 2017/0354877 A1    Dec. 14, 2017

(51) Int. Cl.
*A63F 13/00* (2014.01)
*A63F 13/35* (2014.01)
(Continued)

(52) U.S. Cl.
CPC .............. *A63F 13/35* (2014.09); *A63F 13/32* (2014.09); *A63F 13/332* (2014.09);
(Continued)

(58) Field of Classification Search
CPC .. G07F 17/32; G07F 17/3239; G07F 17/3225; G07F 17/3241; A63F 2300/5566; A63F 13/12; A63F 2300/535; A63F 13/79; A63F 13/32; A63F 13/332; A63F 13/335; A63F 13/35; A63F 13/92; A63F 2300/407; A63F 2300/5533; A63F 13/795; A63F 2300/5546
See application file for complete search history.

(56) References Cited

U.S. PATENT DOCUMENTS

| | | | | |
|---|---|---|---|---|
| 5,261,820 A | * | 11/1993 | Slye | A63F 13/10 273/237 |
| 2015/0273339 A1 | * | 10/2015 | Lavery | A63F 13/00 463/29 |

(Continued)

OTHER PUBLICATIONS

Z0mbiN3, "[Tool] EU4 Save Sharing [MP]" Paradox Interactive Forums thread, Jul. 23, 2015, Paradox, <https://forum.paradoxplaza.com/forum/index.php?threads/tool-eu4-save-sharing-mp.872553/>.*

*Primary Examiner* — Justin Myhr

(74) *Attorney, Agent, or Firm* — Baker & Hostetler LLP

(57) ABSTRACT

Embodiments of the present disclosure provide techniques for initiating direct-connection multiplayer game sessions and for resuming a previously-adjourned multiplayer game session using a stored game object representing a state of the game session. In one exemplary method, a multiplayer gaming application may be executed on a first terminal, which may be associated with a first user. The first terminal may access a game object stored on a content management server that contains data representing a state of a previously adjourned session of the multiplayer gaming application. Further, the first terminal may determine, from the game object, a second terminal associated with a second user. The first terminal may host a session between the first terminal and the second terminal. Finally, an updated game object reflecting an updated state of the session may be stored on the content management system.

21 Claims, 7 Drawing Sheets

(51) Int. Cl.
*A63F 13/79* (2014.01)
*A63F 13/92* (2014.01)
*A63F 13/53* (2014.01)
*A63F 13/32* (2014.01)
*A63F 13/332* (2014.01)
*A63F 13/335* (2014.01)
*A63F 13/49* (2014.01)
*A63F 13/48* (2014.01)

(52) U.S. Cl.
CPC ............ *A63F 13/335* (2014.09); *A63F 13/48* (2014.09); *A63F 13/49* (2014.09); *A63F 13/53* (2014.09); *A63F 13/79* (2014.09); *A63F 13/92* (2014.09)

(56) References Cited

U.S. PATENT DOCUMENTS

2015/0356820 A1* 12/2015 Hutcheson .......... G07F 17/3295
 463/23
2015/0375101 A1* 12/2015 George .................. A63F 13/00
 463/24
2017/0050111 A1* 2/2017 Perry .................... A63F 13/355

\* cited by examiner

300

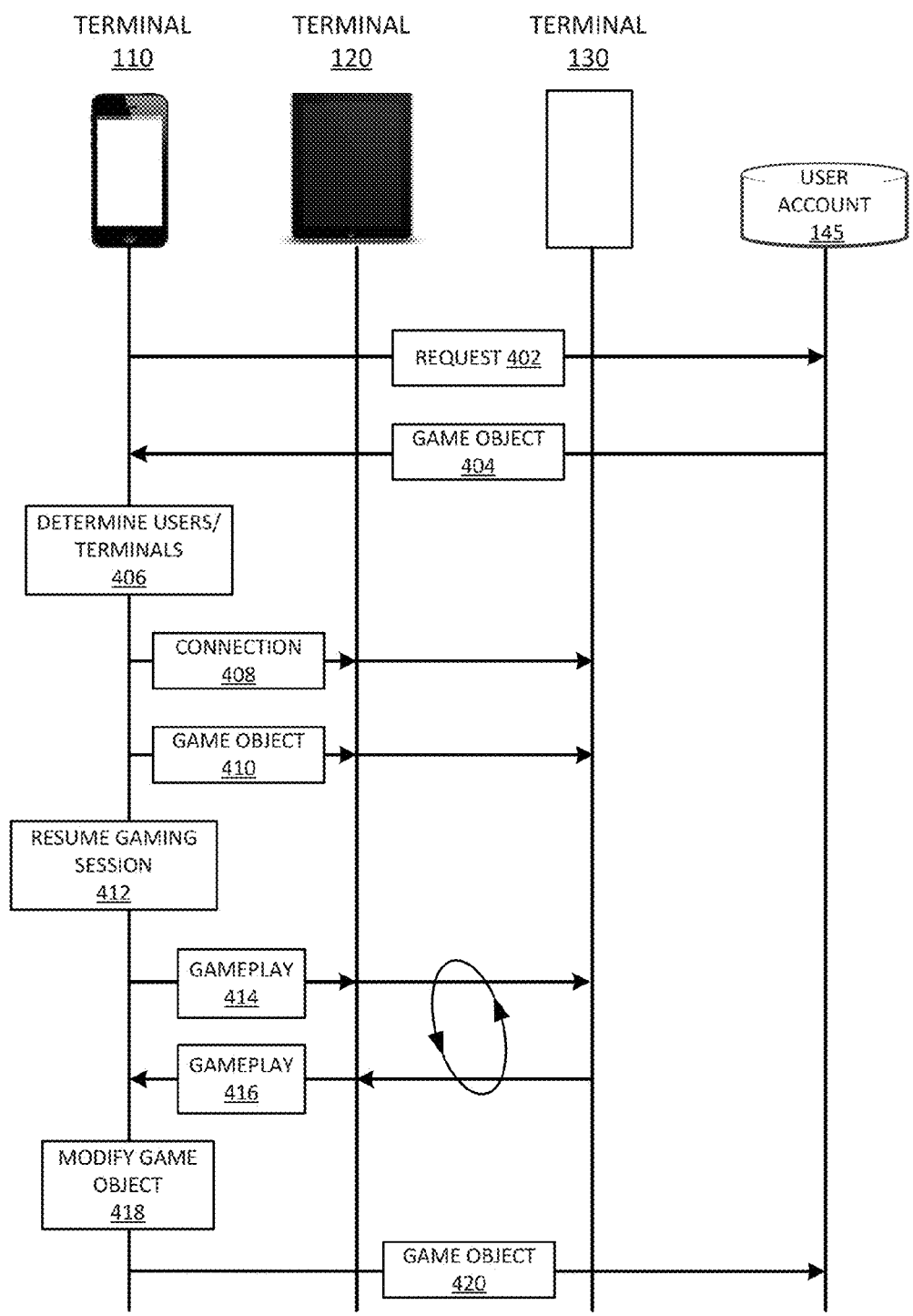

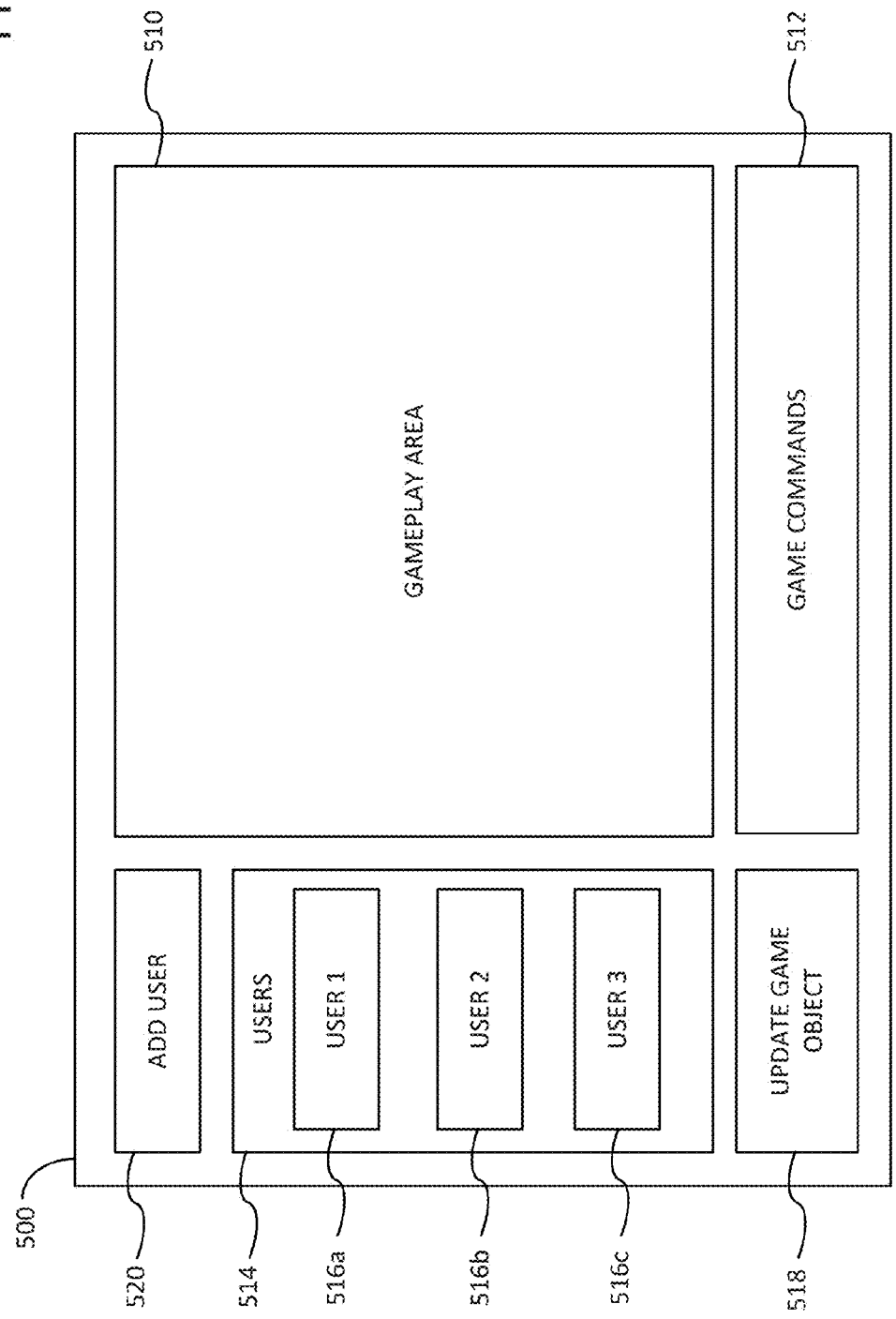

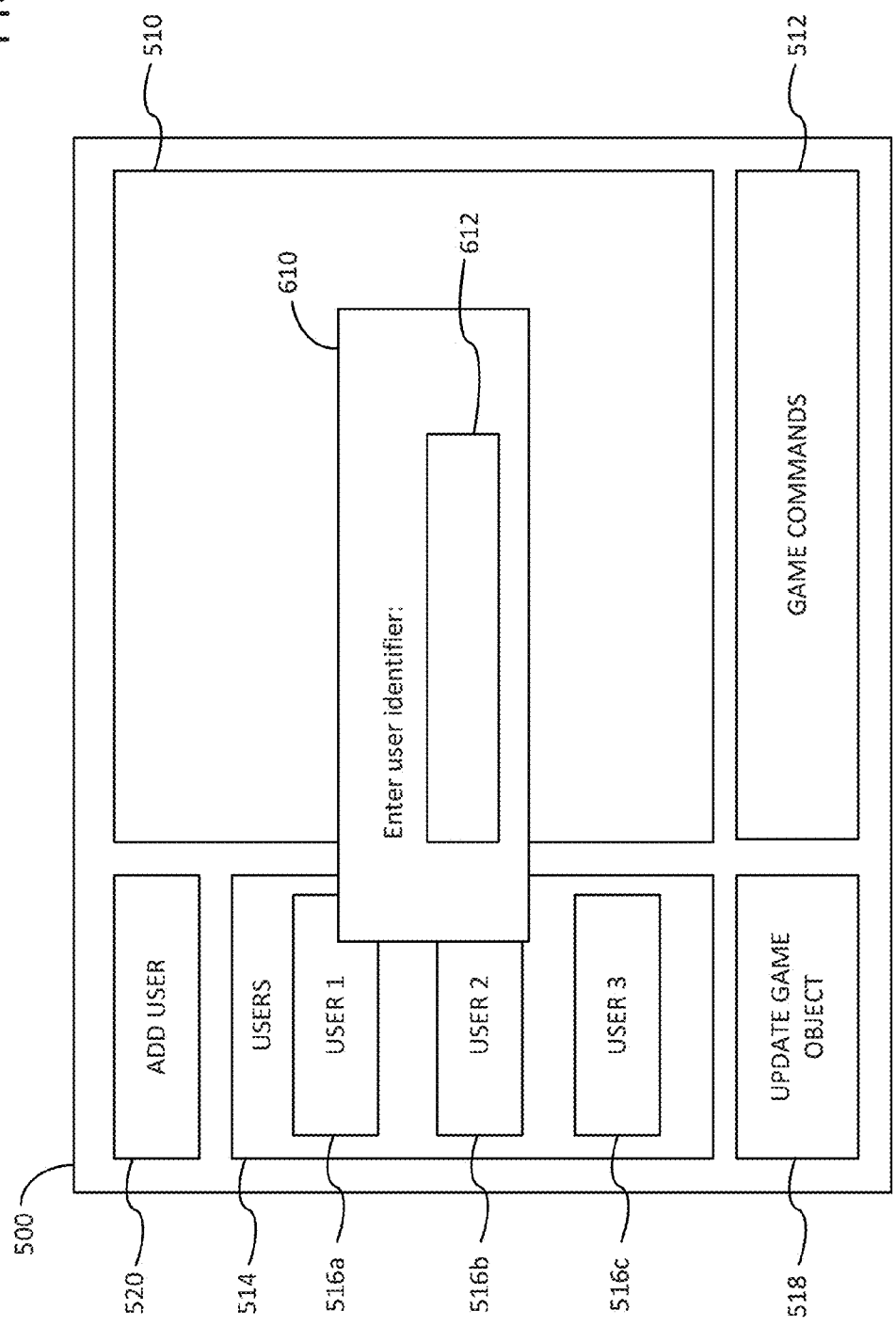

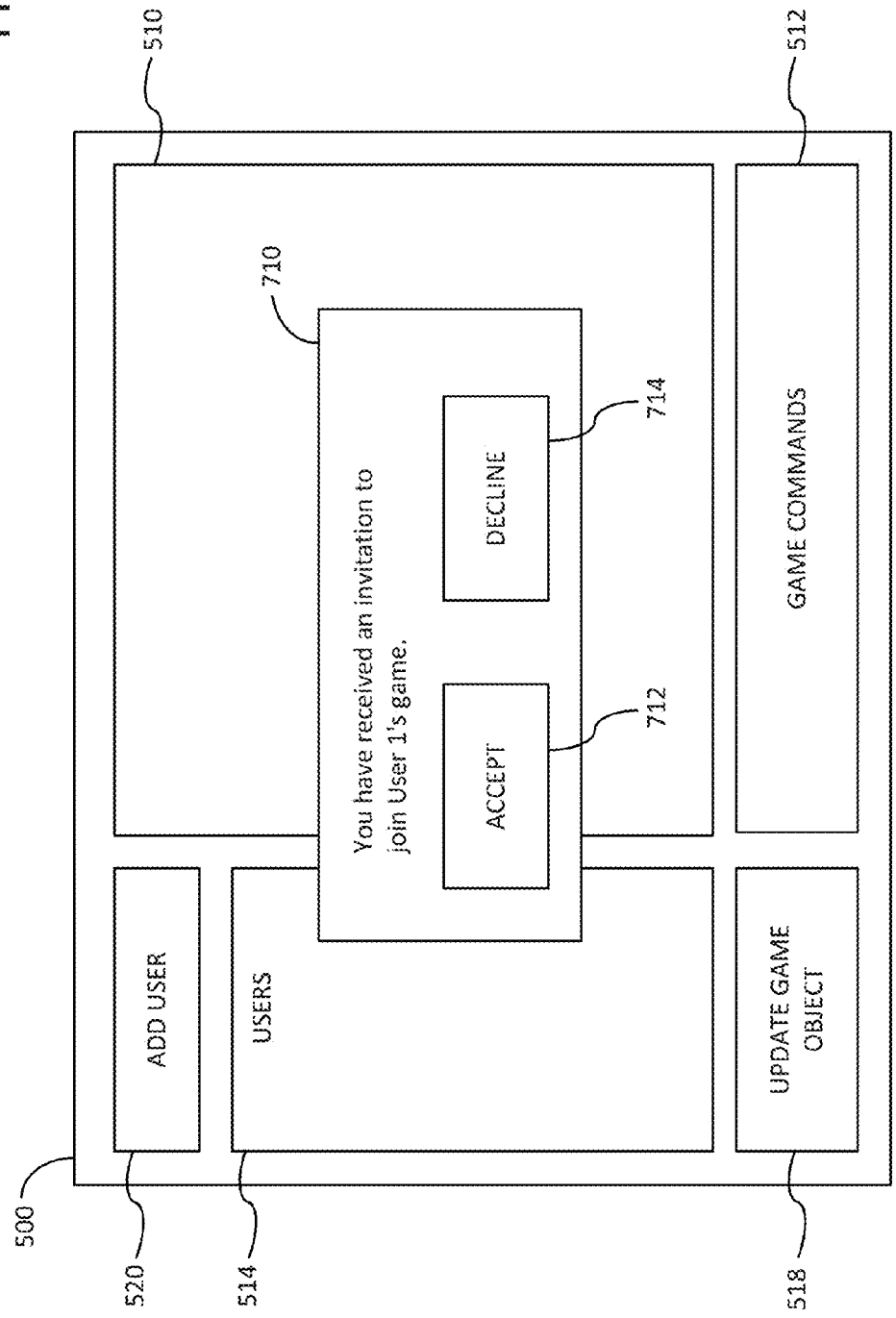

PERSISTENT GAME SESSIONS WITH MULTIPLAYER SUPPORT

BACKGROUND

The present disclosure relates to persistent game sessions with multiplayer support.

With the recent ubiquity of mobile devices, such as smart phones and tablet computers, multiplayer gaming applications played on such devices have similarly seen a rise in popularity. In a conventional implementation, multiplayer gaming applications supporting multiple user devices typically adopt a client-server model in which the user devices serve as game clients and an intermediary game server coordinates all gameplay and other communications between the user devices. The game server maintains all or most aspects of the game state of the multiplayer gaming application, such as relative in-game character positioning, board positions, character status (e.g. character health), etc., as well as information pertaining to which user devices and users are participating m any given multiplayer game session.

This conventional client-server arrangement presents several disadvantages. One such disadvantage is that the user devices typically must remain connected to a large-scale network, such as the Internet or a cellular network, to maintain communication with the game server and, thus, be able to play the multiplayer gaming application. In the absence of such a connection, despite having access to a small-scale network (such as a local-area network (LAN) or Bluetooth® connection) a user will likely be unable to participate in a multiplayer gaming application game session under the client-server model. In addition, since all or most of the game state information pertaining to a particular multiplayer game session is stored on the game server, it may be difficult for a user to resume a multiplayer game session that was previously adjourned. These and other shortcomings are addressed in the present disclosure.

BRIEF DESCRIPTION OF THE DRAWINGS

FIG. 4 illustrates a method according to an embodiment of the present disclosure.

FIG. 5 illustrates a user interface according to an embodiment of the present disclosure.

FIG. 6 illustrates a user interface according to an embodiment of the present disclosure.

FIG. 7 illustrates a user interface according to an embodiment of the present disclosure.

DETAILED DESCRIPTION

Embodiments of the present disclosure provide techniques for initiating direct-connection multiplayer game sessions and for resuming a previously-adjourned multiplayer game session using a stored game object representing a state of the game session. In one exemplary method, a multiplayer gaming application may be executed on a first terminal, which may be associated with a first user. The first terminal may access a game object stored on a content management server that contains data representing a state of a previously adjourned session of the multiplayer gaming application. Further, the first terminal may determine, from the game object, a second terminal associated with a second user. The first terminal may host a session between the first terminal and the second terminal. Finally, an updated game object reflecting an updated state of the session may be stored on the content management system.

Figure 1:
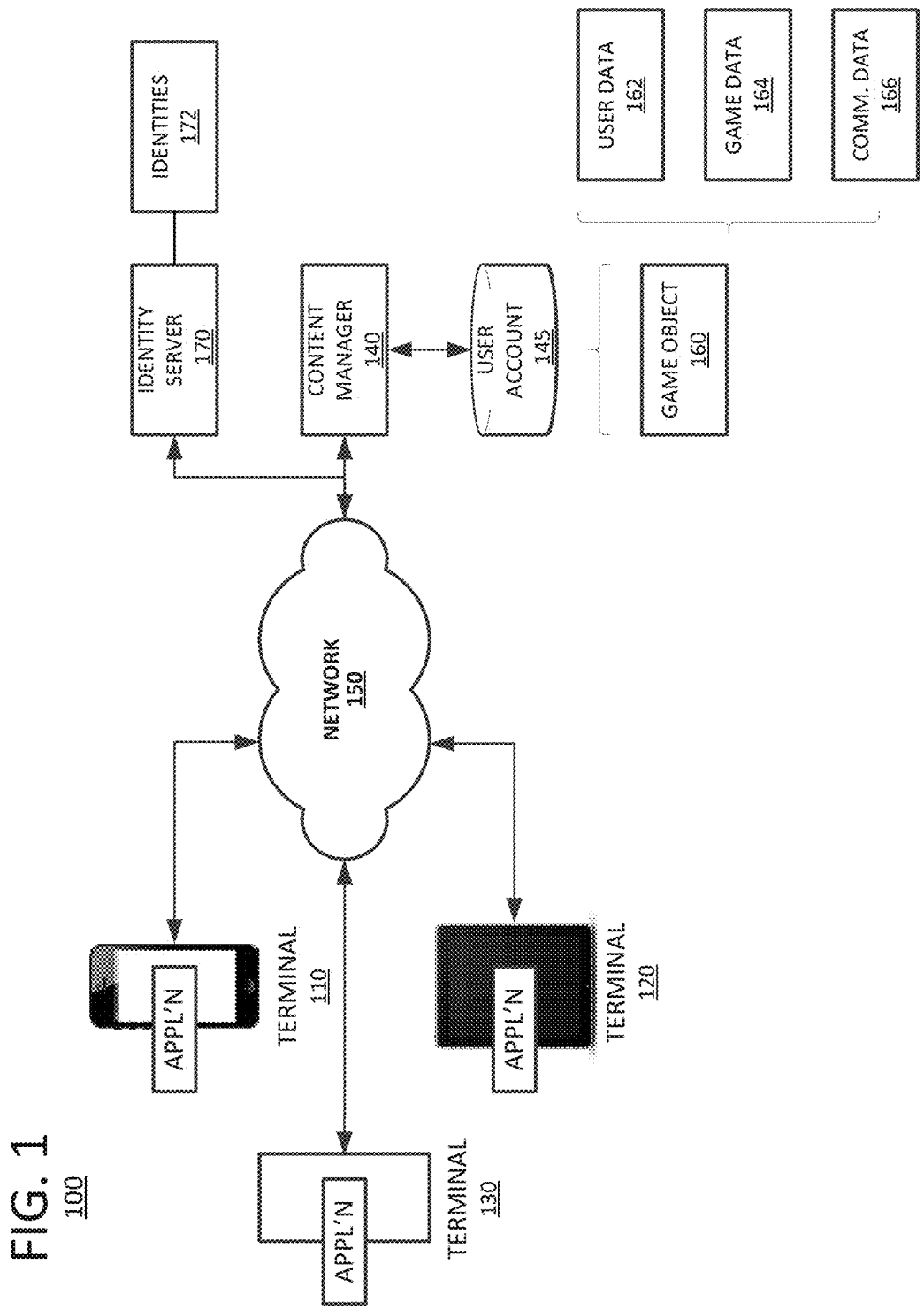
FIG. 1 illustrates a multiplayer gaming system according to an embodiment of the present disclosure.

FIG. 1 illustrates a multiplayer gaming system 100 according to an embodiment of the present disclosure. The system 100 includes several terminals 110, 120, 130 in communication with a network 150 and, by extension, each other. Each terminal 110, 120, 130 may be configured to run a gaming application, in particular a multiplayer gaming application connected to a corresponding multiplayer gaming application running on one or more of the other terminals 110, 120, 130. The first terminal 110 may connect, via the network 150, to an identity server 170 for purposes of identifying the first terminal 110 (and/or a user thereof), as well as identifying the second or third terminals 120, 130 (and/or a user thereof) with which the multiplayer gaming application is played. The first terminal 110 may further connect, via the network 150, to a content manager 140 with a user account 145 in which a game object 160 is stored and available for retrieval and/or modification. The game object 160 may contain data, including user data 162, game data 164, and communication data 166, associated with a game session of the multiplayer gaming application, which may be used by the first terminal 110 to resume a persistent game session of the multiplayer gaming application, with the second and/or third terminals 120, 130. In other words, the game object 160 allows the users of the various terminals 110, 120, 130 to save the game state of a game session of the multiplayer gaming application and return to that same game state of the multiplayer gaming application at a later time.

In FIG. 1, the first terminal 110 is illustrated as a tablet computer and the second terminal 120 is illustrated as a smart phone. However, the terminals 110, 120, 130 are not so limited and may be embodied by any manner of computing device capable of executing a multiplayer gaming application. For example, the terminals 110, 120, 130 may include mobile devices (e.g., mobile phones, smart phones, or tablet computers), personal computers (e.g., desktop computers or laptop computers), gaming devices (e.g., gaming consoles or handheld gaming devices), set-top computing devices (e.g., digital media players), or any combination thereof. In a typical implementation, the terminals 110, 120, 130 are each configured with a memory, processor, and display. The multiplayer gaming application may be stored in the memory, executed by the processor, and visually portrayed via the display. The terminals 110, 120, 130 may each further be configured with an input, such as a pointing device, touchscreen, one or more buttons, a keyboard, or the like by which the user may interact with the multiplayer gaming application.

Each of the terminals 110, 120, 130 may be configured to execute a multiplayer gaming application. A multiplayer gaming application may be an entertainment application or program that involves the interaction of two or more users via two or more respective terminals 110, 120, 130; the multiplayer gaming applications, may execute on the respective terminals 110, 120, 130 and communicate with each other. A multiplayer gaming application may define a real-time multiplayer game in which two or more users interact with their respective multiplayer gaming application on their respective terminal 110, 120, 130 and, by extension, one another contemporaneously. Examples of real-time multiplayer gaming applications may include first-person shooter (FPS), racing, or real-time strategy (RTS) games. Alternatively, a multiplayer gaming application may define a turn-based multiplayer game in which the gameplay advances in "turns" wherein one user initiates a play, action, or move while the other user(s) idle until it is that user's turn to perform a play, action, or move. For example, turn-based multiplayer games may include card games (e.g., poker), board-type games (e.g., checkers or chess), or turn-based strategy games.

The instances of a multiplayer gaming application on the respective terminals 110, 120, 130 need not necessarily mirror one another in gameplay, but may instead each asymmetrically display or otherwise provide different aspects of the gameplay of the multiplayer gaming application. For example, the first terminal 110 (e.g., a tablet computer or a computing device whose display is provided to a large-screen television) may serve as a central display viewable by all users while the second and third terminals 120, 130 (connected to the first terminal 110) each provide an interaction with the multiplayer gaming application that is specific to those respective users.

For instance, in one aspect, the first terminal 110 may provide an instance of the multiplayer gaming application that emulates a poker table that is visible to all the users. The second and third terminals 120, 130 may each provide an instance of the multiplayer gaming application providing interaction with the respective user's poker hand, chips, and so forth, which would preferably only be visible to that user. As the users play cards and/or bet chips using their respective terminals 120, 130, the display of the poker table on the first terminal 110 would accordingly reflect such plays on its display of the poker table. In another aspect, the instance of the multiplayer gaming application on the first terminal 110 may display a roulette table and the instances of the multiplayer gaming application on the second and third terminals 110 would provide an interface in which the respective users may place bets. In yet another aspect, the instance of the multiplayer gaming application on the first terminal 110 may provide a board of a board game, viewable to all users. Each instance of the multiplayer gaming application on the second and third terminals 120, 130 may display private holdings (e.g., tiles, cards, or other game pieces) for the respective user, as well as an interface for the respective user to effectuate one or more game commands. As the users play game pieces and/or perform game commands via the second and third terminals 120, 130, the board displayed on the first terminal 110 is accordingly updated.

The network 150 may represent any number of networks capable of conveying the various data communications described herein, including for example wireline and/or wireless communication networks. Representative networks include telecommunications networks, local area networks, wide area networks, and/or the Internet. It is further explicitly contemplated that the network 150 may embody a peer-to-peer connection between the terminals 110, 120, 130, such as via Bluetooth® or other short-range radio protocol. Further, the terminals 110, 120, 130 may directly connect with one another for purposes of participating in a session of gameplay with the respective instances of the multiplayer gaming application, without requiring support of a game server to host the game (i.e., a server or other computing device used in some conventional implementations to coordinate and maintain game information, such as game states, player moves or commands, player avatar positions, etc., between terminals). Instead, two or more of the terminals 110, 120, 130 of the present disclosure may effectuate multiplayer gameplay by communicating game information between one another. This direct connection between the terminals 110, 120, 130 may be peer-to-peer (e.g., Bluetooth®) or may pass through one or more telecommunication or networking mediums, such as the Internet, a cellular network, etc.

The identity server 170 may represent one or more computing devices providing identity services. In particular, the identity server 170 may maintain an identity repository 172 of identities. An identity may be associated with a user of one of the terminals 110, 120, 130 and may be used to identity a user and/or an associated terminal 110, 120, 130. An identity may include a number of attributes relating to a user and/or an associated terminal 110, 120, 130. An attribute of an identity may include a unique identifier, such as a user id, a user number, an email address, or a phone number (e.g., a phone number associated with the user's terminal 110, 120, 130). An attribute also may relate to personal information about the user, such as the user's name or nickname/alias. An attribute may further relate to the terminal 110, 120, 130 associated with the user, including an IP (internet protocol) address, a MAC (media access control) address, a phone number, or other information that may be used to identify and/or connect to the terminal 110, 120, 130. Such attributes may additionally reflect various characteristics of the terminal 110, 120, 130, such as device type, hardware characteristics, operating system, connection capabilities (e.g., whether the terminal 110, 120, 130 is configured to establish a Bluetooth® connection), and applications (e.g., a particular multiplayer gaming application) installed on the terminal 110, 120, 130. An identity may also include an authentication attribute, such as a text password, a biometric profile, or a gesture password. It will be appreciated that any of the aforementioned attributes may function as a unique identifier of an identity so long as said attribute is unique among the identities in the identity repository 172.

In operation, a requesting terminal 110, 120, 130 may transmit a unique identifier to the identity server 170, whereupon the identity server 170 receives the unique identifier. Upon receipt of the unique identifier, the identity server 170 may cross-reference the unique identifier with the identities of the identity repository 172 and determine the identity corresponding to the unique identifier. Accordingly, one or more attributes of the identity may be transmitted back to the requesting terminal 110, 120, 130.

In some aspects, for example where a user transmits his or her own unique identifier, the requesting terminal 110, 120, 130 may also transmit an authentication attribute with or following the unique identifier. The provided authentication attribute may be checked by the identity server 170 against the stored authentication attribute associated with the identity to ensure that the user has provided his or her correct authentication attribute. Upon this authentication, the user's identity, and attributes thereof, may be used in various functionalities of the user's terminal 110, 120, 130, such as to identify the user in a multiplayer gaming, application executing on the user's terminal 110, 120, 130.

In other aspects, for example where a user transmits another user's unique identifier, the requesting terminal 110, 120, 130 need not transmit an authentication attribute in concert with the unique identifier. In such an instance, the identity server 170 may return back only a limited subset of the attributes of the identity corresponding to that unique identifier. As an example, a first user, via the first terminal 110, may transmit a unique identifier for the identity of a second user to the identity server 170. Based on the transmitted unique identifier, the identity server 170 may determine the identity of the second user and return one or more attributes of the second user's identity to the first terminal 110. The attributes of the second user's identity may be used by the first terminal 110 (e.g., by the multiplayer gaming application executing on the first terminal 110) to facilitate multiplayer gameplay with the second user. For instance, the attributes of the second user's identity may include an attribute (e.g., an IP address, MAC address, or other terminal identifier) usable to effectuate connection with the second terminal 120 used by the second user. Accordingly, the instance of the multiplayer gaming application executing on the first terminal 110 may connect to and establish a multiplayer game session with the instance of the multiplayer gaming application executing on the second terminal 120.

Figure 2:
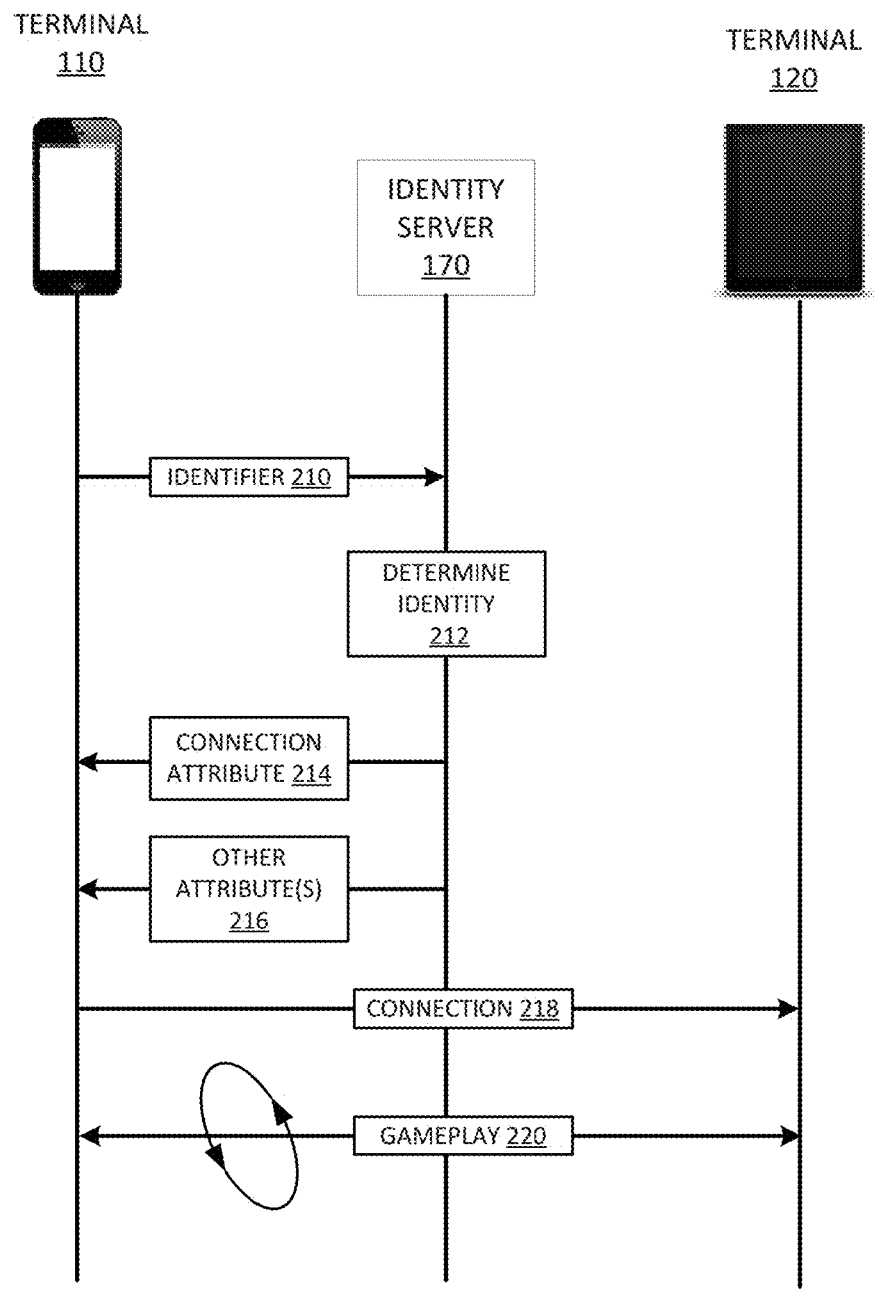
FIG. 2 illustrates a method according to an embodiment of the present disclosure.

FIG. 2 illustrates a method 200 of establishing a multiplayer game session according to an embodiment of the present disclosure. According to the method 200, the first terminal 110, having an instance of a multiplayer gaming application installed thereon, transmits an identifier (e.g., a unique identifier) to the identity server 170 (box 210). The identifier provided to the identity server 170 may be an identifier associated with the second terminal 120 and/or the user thereof, For example, the first terminal 110 may provide the second terminal's 120 user's username, email address, or phone number. Upon receipt of the identifier from the first terminal 110, the identity server 170 may determine an identity, such as from the identity repository 172, corresponding to the received identifier (box 212). Preferably, the determined identity is associated with the second terminal 120 and/or the user thereof. As discussed in detail above, the determined identity may include one or more attributes relating to the associated user and/or the user's terminal(s).

The identity server 170 may transmit a connection attribute to the first terminal 110, wherein the connection attribute relates to the second terminal 120 (box 214). The connection attribute may include, for example, an IP address, a MAC address, a phone number, a terminal identifier, or other attribute that may be used by the first terminal 110 to effectuate a connection with the second terminal 120. Optionally, the identity server 170 may also transmit other attribute(s) relating to the second terminal 120 and/or user thereof to the first terminal 110 (box 216). The other attribute(s) may include any attribute discussed here, including an attribute describing a characteristic of second terminal's 120 user (e.g., name, image of the user, age, gender, alias or nickname, etc.) or an attribute describing a characteristic of the second terminal 120 (e.g., device type, operating system, hardware profile, connection capabilities, or whether the second terminal 120 has the multiplayer gaming application installed).

Upon receipt of the connection attribute and, optionally, the other attribute(s) from the identity server 170, the first terminal 110 may use the connection attribute to directly connect to the second terminal 120 (box 218). Said connection may then be used by the instances of the multiplayer gaming application executing on each of the first and second terminals 110, 120 effectuate gameplay in a multiplayer game session (box 220). The gameplay in the multiplayer game session will typically involve back-and-forth communications between the first and second terminals 110, 120, such as to communicate respective game commands initiated by each user. In one aspect, the first terminal 110 may establish the connection with the second terminal 120 at the terminal level (i.e., not within the multiplayer gaming application), such as before the multiplayer gaming application is initiated on the first terminal 110. Similarly, the user of the first terminal 110 may cause the first terminal 110 to provide the identifier to the identity server 170 using an application or interface on the first terminal 110 other than the multiplayer gaming application. Yet in another aspect, the multiplayer gaming application executing on the first terminal 110 may be used to cause the first terminal 110 to provide the identifier to the identity server 170 and/or to establish the connection with the second terminal 120. For example, as will be described in more detail in relation to FIGS. 5-6, the multiplayer gaming application may include an interface that allows a user to enter an identifier and subsequently connect to the terminal associated with that identifier upon receipt of the connection attribute from the identity server 170.

Although the method 200 involves the two terminals 110, 120, the method 200 is not so limited and may be similarly applied to any arrangement including two or more terminals.

Referring again to FIG. 1, the system may also include the content manager 140. The content manager 140, in turn, may include one or more servers or other computing devices configured to maintain one or more user accounts 145 in which one or more game objects 160 are stored. For example, the content manager 140 may be considered a "cloud" server by which a user may upload, download, delete, replace, and/or modify a digital file, such as, particularly, the game object 160. Notably, the content manager 140 is unaffiliated with the developer and/or publisher of the multiplayer gaming application. Instead, the content manager 140 is managed by a third-party that provides online file storage for users.

The user account 145 on the content manager 140 may be associated with a user of one of the terminals 110, 120, 130. As with the content manager 140, the user account 145 is similarly unaffiliated with the developer and publisher of the multiplayer gaming application. The content manager 140 may, upon receipt of a request from a user via one of the terminals 110, 120, 130, identify the user account 145 associated with that user and provide, receive, delete, replace, and/or modify the game object 160 according to the request. The request may be accompanied by an identifier of the user and/or the user account 145, as well as, in some aspects, an authenticator (e.g., a password, biometric profile, etc.) by which the content manager 140 authenticates the user to the user account 145. In some aspects, the content manager 140 may communicate with the identity server 170 such that a user's identification with the identity server 170 may also serve to identify the user account 145 associated with the user and/or authenticate the user to the user account 145.

In one aspect, the user account 145 may be associated with two or more users whereby each of the associated users may have full rights to upload, download, delete, replace, and/or modify the game object 160. In another aspect, the user account 145 may be associated with only one user but may permit other non-specified users to perform designated operations (upload, download, delete, replace, modify, etc.) relating to the game object 160. For example, the user associated with the user account 145 may have full operation rights with respect to the game object 160, but other non-specified users may only be permitted to download the game object. In yet another aspect, the user account 145 may be associated with one or more primary users and one or more secondary users. The primary users may be afforded one set of operation rights (e.g., full rights to upload, download, delete, replace, modify, etc.) while the secondary users may be afforded a more limited set of operation rights (e.g., only rights to download).

The game object 160 may be embodied as a digital file including data pertaining to a game session of the multiplayer gaming application. The game object 160 may be used by one or more of the terminals 110, 120, 130 and/or the instance of the multiplayer gaming application executing thereon to capture the state (or aspects thereof) of the game session and, at a later point in time, resume gameplay at the captured game state of the previous game session. Thereby, the game object 160 may allow a persistent game session to be maintained across two or more chronologically separate game sessions of the multiplayer gaming application.

The data in the game object 160 necessary to sufficiently capture the state of a game session will naturally vary according to the particular multiplayer gaming application. Therefore, the data type(s), structure, or template of the game object 160 may be pre-determined by the developer of the multiplayer gaming application. Conversely, the content of the game object 160 is determined by the instance of the multiplayer gaming application executing on the terminal 110, 120, 130.

While the game object 160 may be stored on the content manager 140 between separate game sessions, in some aspects the game object 160 may be downloaded to one or more of the terminals 110, 120, 130 participating in a game session wherein the game object 160 may be locally modified according to a current game state and then uploaded to the user account 145 on the content manager 140 to replace the previous version of the game object 160 or to create a new version of the game object 160 while keeping the previous version as a backup or alternative version. The game object 160 may be locally modified and/or uploaded to the user account 145 on the content manager 140 at various intervals, at the conclusion or adjournment of the discrete game session, or on command. The various intervals may include, for example, the end of a turn, the completion of a map or level, the defeat of a significant enemy character (e.g., a "boss"), the end of a game or round, or pre-specified time intervals (e.g., every five minutes). In other aspects, the game object 160 may be directly modified on the content manager 140 by one or more of the terminals 110, 120, 130 and/or the instance of the multiplayer gaming application executing thereon. Similarly, the game object 160 may be modified on the content manager 140 at the same sorts of intervals as described above and/or at the end or adjournment of the discrete game session.

In the event that a game session has recently been initiated and there is not yet an associated game object 160, either locally on one or more of the terminals 110, 120, 130 or on the content manager 140, a new game object 160 may be created. The new game object 160 may be created locally on the one or more terminals 110, 120, 130 and later uploaded to an appropriate user account 145 on the content manager 140 or the new game object 160 may be directly created in an appropriate user account 145 on the content manager 140.

Given that a game session will typically involve the participation of multiple users and multiple terminals 110, 120, 130, in one aspect, one of the terminals 110, 120, 130 (e.g., the terminal 110) may be designated as a master terminal and undertake the tasks of creating, uploading, downloading, modifying, etc., the game object 160 while the remaining terminals 110, 120, 130 (e.g., the second and third terminals 120, 130) may be designated as slave or secondary terminals and do not perform any operations relating to the game object 160. In another aspect, all of the terminals 110, 120, 130 participating in the game session may each locally maintain a respective game object 160 and upload and/or modify the respective game object 160 to the content manager 140. In this arrangement, the uploaded and/or modified game objects 160 may be maintained in separate user accounts 145 corresponding to the respective users of the terminals 110, 120, 130 or the uploaded and/or modified game objects 160 may be maintained in a single user account 145 that is associated with each user of the terminals 110, 120, 130 or that otherwise permits those users to upload and/or modify the game object(s) 160 in the single user account 145.

The game object 160 may include user data 162, game data 164, and/or communication data 166. The user data 162 includes data relating to the users participating in a game session. For example, the user data 162 may include an identification of the users participating, in a game session. The identification of a user may include a user id, a name, a screen name, an alias, or a phone number. The user data 162 may further include an identification of the terminals 110, 120, 130 involved in the game session. The identification of a terminal 110, 120, 130 may include a terminal name or alias, a phone number, a MAC address, or an IP address of the terminal 110, 120, 130. The user data 162 may also include a connection status for each user and/or terminal 110, 120, 130 involved in a game session. In particular, the connection status may indicate whether a certain user and/or terminal 110, 120, 130 was online or offline in the game session at the point of time that the state of the game session was captured (a user and/or terminal 110, 120, 130 may still be deemed to be participating in a game session while that terminal 110, 120, 130 is disconnected from the other terminals 110, 120, 130). The user data 162 may subsequently be used to determine the users and/or terminal 110, 120, 130 involved in a game session and re-invite and/or re-connect those users and/or terminals 110, 120, 130 to the resumed game session.

The game data 164 may include any data representing the captured state of the game session of the multiplayer gaming application. The principles of the present disclosure find application with many types of multiplayer gaming application and, therefore, the specific aspects comprising a captured game state will be driven by the requirements of the specific multiplayer gaming application. As some general examples, the game data 164 may include game character status, map or level data (e.g., which map or level is currently being played), in-game resource (e.g. coins or other currency) status, a user's playable gaming pieces (e.g., hand of cards), or score. As a specific example of game data 164 wherein the multiplayer gaming application is a checkers game, the game data 164 may include a representation of the checkers board at a given time, such as the board position of each of the checkers pieces, how many checkers pieces of each color have been eliminated from the game, which checkers pieces are "kinged", and an ongoing win-loss record for each user in the game session. As another specific example of the game data 164 wherein the multiplayer gaming application is a first-person shooter (FPS) game, the game data 164 may include the current map being played, the position of each user's character within the map, the weapons in each user's character's inventory, the weapon currently equipped by each user's character, the amount of ammunition carried by each user's character, the health and/or armor status of each user's character, and the model, class, or type of character controlled by each user.

The communication data 166 may include a record of in-game communication between the users during a game session. For example, the multiplayer gaming application may support peer-to-peer messaging between the terminals 110, 120, 130 participating in the game session. A record of such messages may be included in the communication data 166 for persistence when the game session is resumed at a later time. Similarly, the multiplayer gaming application may support voice communication between users and a record of this voice communication may also be included in the communication data 166. In some aspects, only the communications between the users during a pre-defined period of time before the creation or update of the game object 160 is included in the communication data 166. For example, only the communications occurring in the ten-minute period before the game state is captured in the game object 160 may be included in the communication data 166. In further aspects, the communications included in the communication data 166 need not be strictly within the multiplayer gaming application but may also include communications occurring via an application or communication interface of the terminal 110, 120, 130 operating in coordination with the multiplayer gaining application, such as a short message service (SMS) interface present on many mobile devices (e.g., smart phones).

Figure 3:
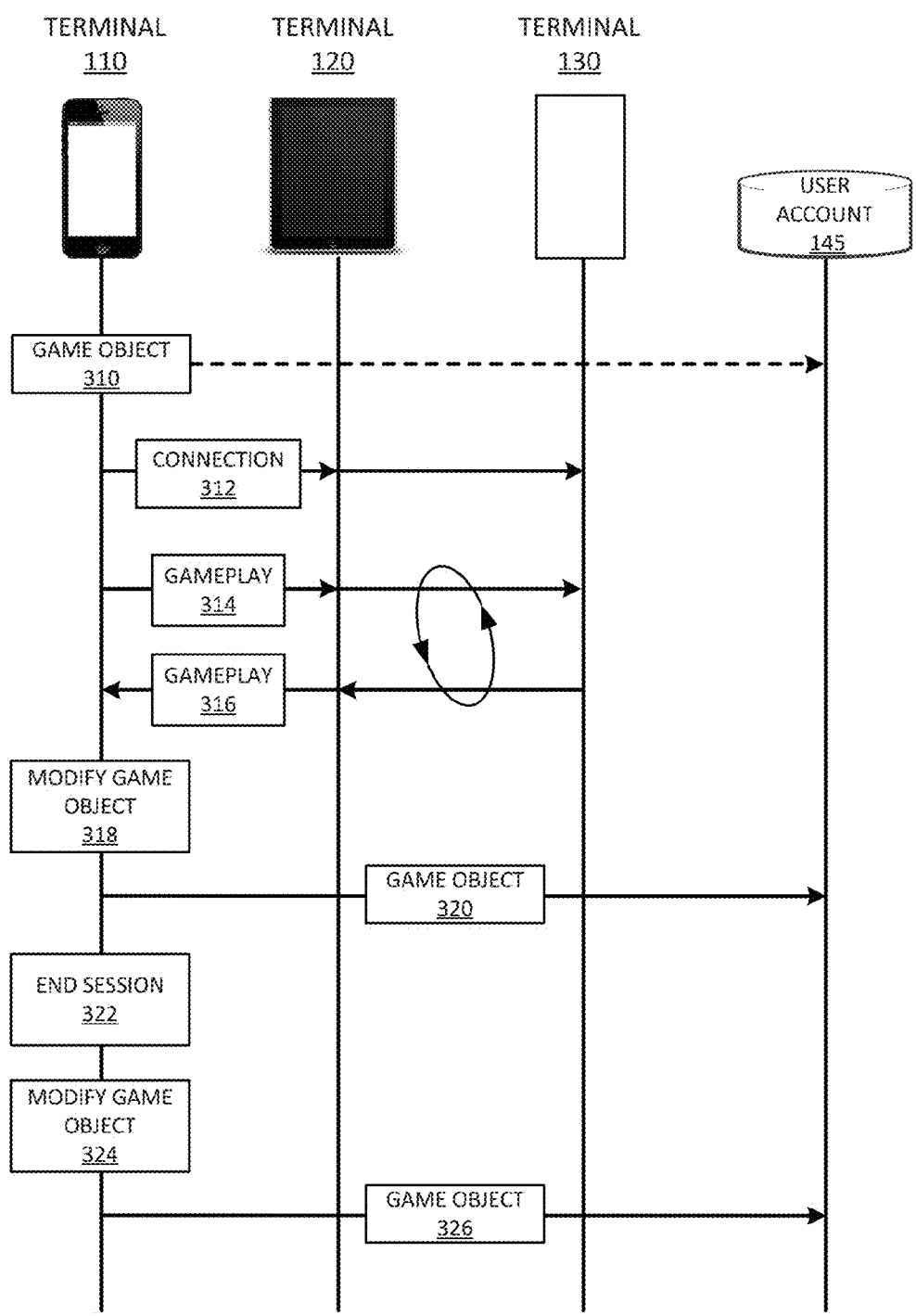
FIG. 3 illustrates a method according to an embodiment of the present disclosure.

FIG. 3 illustrates one exemplary method 300 of initiating a multiplayer game session, the game state of which is embodied in the game object 160. In accordance with the method 300, an instance of a multiplayer gaming application may be executed on the first terminal 110 and the game object 160 may be created by the first terminal 110 (box 310). The game object 160 may be created locally on the first terminal 110 and subsequently uploaded to the user account 145 on the content manager 140, created directly in the user account 145 on the content manager 140, or created locally on the first terminal 110 and maintained there for the time being.

The first terminal 110 may establish connections to the second terminal 120 and the third terminal 130 (box 312). Although the method 300 specifically contemplates the three terminals 110, 120, 130, the method 300 is equally applicable to any arrangement with two or more terminals. The connections with the second and third terminals 120, 130 may be established according to the method 200 described in relation to FIG. 2 in which the first terminal 110 uses the identity services provides by the identity server 170 to ascertain connection attributes relating to the second and third terminals 120, 130 which are then used by the first terminal 110 to establish those connections. Alternatively, the connections to the second and third terminals 120, 130 may be established using connection information already known to the first terminal 110 and/or user thereof or received from an external source. For example, the connection information may be stored in a directory of phone contacts present on the first terminal 110 or the connection information may be received from a social networking application or site. Establishing the connections to the second and third terminal 120, 130 may include sending, within the instance of the multiplayer gaming application executing on the first terminal 110, an invitation to the other users, which is received and displayed within the respective instances of the multiplayer gaming application executing on the second and third terminals 120, 130. Alternatively, the invitations may be sent and/or received outside of the multiplayer gaming application, such that said invitation prompts the receiving user to launch the multiplayer gaming application on the respective second or third terminal 120, 130 and join the multiplayer game session. Upon acceptance of the invitations, the connection with the second and third terminals 120, 130 may be established and the respective users may be joined to the multiplayer game session of the multiplayer gaming application.

After the connection is established between the first terminal 110 and the second and third terminals 120, 130, the gameplay of the multiplayer game session may commence. Such multiplayer gameplay may include ongoing communications amongst the terminals 110, 120, 130, such as communications regarding game commands or moves, game character status updates, or messages between the users (boxes 314, 316). At various intervals during the gameplay (e.g. the end of a turn, the end of a level or map, upon a manual request by a user, etc.), the game object 160 may be modified by the first terminal 110 (or modified (not shown) by the second and/or third terminals 120, 130) according to the current state of the game session. For example, the user data 162 of the game object 160 may be updated to reflect that the second and third terminals 120, 130 and/or users thereof are participating in the game session. The game data 164 of the game object 160 may be updated to reflect the current various game variables, such as the map or level, the relative position of each user's character on the map or level, character health or asset status, etc. The communication data 166 of the game object 160 may be similarly updated. For example, the communication data 166 may be updated to reflect the text messages transmitted between the users during the game session up to that point.

The modified game object 160 may be uploaded from the first terminal 110 (or uploaded (not shown) from the second and/or third terminals 120, 130) to the user account 145 associated with the first terminal 110 and/or user thereof. Such upload may be accompanied, in some instances, by an account identifier and/or an authentication element (e.g., password) to identify the particular user account 145 and authenticate the first terminal 110 with that particular user account 145, respectively. In some aspects, the modification and upload of the game object 160 (boxes 318, 320) may be combined into a single step in which the game object 160 is maintained in the user account 145 and modified directly in the user account 145.

Following additional gameplay (not shown), the game session may adjourn or end (box 322). Responsive to the game session adjourning or ending, the game object 160 may again be modified, as described in greater detail above, to reflect the state of the game session at the end or adjournment of the game session (box 324). The modified game object 160 may subsequently be uploaded to the user account 145 associated with the first terminal 110 and/or user thereof, as described above. In some aspects, the modification and upload of the game object 160 (boxes 324, 326) may also be combined into a single step in which the game object 160 is maintained in the user account 145 and modified directly in the user account 145.

Since the ending or adjourning state of the previous game session is recorded and saved in the game object 160, that game session may be resumed at a later point in time using the game object 160, thereby creating a persistent game session despite the temporal interruption. When the persistent game session is resumed at the later point in time, the state of the game is the same, or very near the same, as that when the previous game session ended or adjourned. Such continuity may not just be limited to aspects of the multiplayer gaming application itself, but may also include aspects regarding which users and/or terminals 110, 120, 130 were participating in the previous session, so that they may be rejoined to the persistent game session when it is resumed.

FIG. 4 illustrates an exemplary method 400 of resuming a persistent game session based on the previously created and modified game object 160, such as resuming the game session started and ended/adjourned in the method 300 described in relation to FIG. 3. Initially, the first terminal 110 may send a request to the user account 145 of the content manager 140 to download the game object 160 from the previous game session to the first terminal 110 (box 402). The user account 145 may be associated with the first terminal 110 and/or user thereof, in which case the request may include an account identifier and/or an authentication element (e.g., password). Alternatively, the user account 145 may not be associated with the first terminal 110 and/or user thereof (e.g., the user may not have full rights to the user account 145) but the user account 145 may be configured to allow anonymous downloads of the game object 160 from the user account 145. The first terminal 110 may subsequently download the game object 160 from the user account 145 (box 404). In some aspects, the game object 160 may already be saved locally on the first terminal 110, in which case the above request and download (boxes 402, 404) may be omitted.

Having accessed the game object 160 from the previous game session, the first terminal 110 may begin to resume that game session by determining the terminals and/or users that participated in the previous game session, which in this exemplary method are the second and third terminals 120, 130 and/or users thereof, based on the game object 160, such as the user data 162 included in the game object 160 (box 406). As described above, the user data 162 includes data sufficient to identity the second and third terminals 120, 130 and/or to allow the first terminal 110 to establish a connection with the second and third terminals 120, 130.

In some aspects, the user data 162 may include unique identifiers of the users that participated in the previous game session and the first terminal 110 may use the identity services of the identity server 170 to identify the terminals associated with those users based on the unique identifiers, such as in the method 200 described in relation to FIG. 2. In many cases, these terminals may be the second and third terminals 120, 130 (i.e., the same terminals used by those users in the previous game session). Yet in other cases, the users may be using different terminals. For example, a user may have upgraded their old terminal to a new terminal or the user may have migrated from a smart phone terminal to a table computer terminal in the interim. Inc those cases, the attributes returned by the identity server 170 in the method 200 (boxes 214, 216) may identify the different terminal(s) and provide information sufficient for the first terminal 110 to connect to that terminal.

Based on the determined second and third terminals 120, 130 and/or users thereof, the first terminal 110 may establish connections with the second and third terminals 120, 130. For example, the first terminal 110 may use the IP address, MAC address, or other terminal identifier included in the user data 162 of the game object 160 or received from the identity server 170 to connect to the second and third terminals 120, 130. As described in more detail in relation to the box 312 in the method 300, the connections to the second and third terminals 120, 130 may be established by sending (either within or external to the multiplayer gaming application) invitations to the second and third terminals 120, 130, which in turn may be accepted by the users of the second and third terminals 120, 130 if that user wishes to rejoin the persistent game session. Upon acceptance of the invitation, the second and/or third terminal 120, 130 may be connected to the first terminal 110 and the user(s) of the second and/or third terminal 120, 130 may be added to the persistent game session.

After connecting to the second and third terminals 120, 130, the game object 160 may optionally be transmitted or otherwise provided to the second and third terminals 120, 130 so that each of the respective instances of the multi-player gaming application may resume the persistent game session with the same game state (box 410). Alternatively, the second and third terminals 120, 130 may initiate a request to the content manager 140 to download the game object 160 from the user account 145. Such a request and download may be caused by an instruction (e.g., an instruction including a link to the game object 160 in the user account 145 on the content manager 140) provided to the second and third terminals 120, 130 by the first terminal 110. Also alternatively, the data contained in the game object 160 (e.g., the user data 162, the game data 164, and/or the communication data 166) may be transmitted to the second and third terminals 120, 130 via the instances of the multiplayer gaming application. For example, the instance of the multiplayer gaming application executing on the first terminal 110 may extract all or a portion of the data contained in the game object 160 and transmit that extracted data, or a portion thereof, to the instances of the multiplayer gaming application executing on the second and third terminals 120, 130.

After the first terminal 110 has established connections with the second and third terminals 120, 130, the persistent game session may be resumed based, at least in part, on the game object 160 (box 412). For example, the game session may resume at the same level or map, with the same game board state, with the same scores, with the same card hands, etc. as when the game object 160 was modified and saved when the game session was previously ended or adjourned (e.g., as in boxes 322-324 in the method 300). After the persistent game session is resumed, the gameplay of the multiplayer gaming application may be re-commenced. Such gameplay may include ongoing communications amongst the terminals 110, 120, 130. such as communications regarding game commands or moves, game character status updates, or messages between the users (boxes 414, 416). At various intervals during the gameplay, the game object 160 may be modified by the first terminal 110 (or modified (not shown) by the second and/or third terminals 120, 130) according to the current state of the game session (box 418). Additionally, when this portion of the persistent game session is adjourned or ended, the game object 160 may similarly be modified according to the state of the game session at that time.

Responsive to the modification of the game object 160, either due to the trigger of the aforementioned interval or the end or adjournment of the game session, the game object 160 may be uploaded by the first terminal 110 to the user account 145, which may be associated with the first terminal 110 and/or user thereof (box 420). Such upload may be accompanied, in some instances, by an account identifier and/or an authentication element (e.g., password) to identify the particular user account 145 and authenticate the first terminal 110 with that particular user account 145, respectively. In some aspects, the modification and upload of the game object 160 (boxes 418, 420) may be combined into a single step in which the game object 160 is maintained in the user account 145 and modified directly in the user account 145.

FIG. 5 illustrates an exemplary interface 500 of a multiplayer gaming application. The interface 500 may include a gameplay area 510, in which the primary content of the multiplayer gaming application may be displayed, and a game commands area 512 via which a user may enter various game commands according to the needs of the specific multiplayer gaming application. The interface 500 may further include a user's area 514 in which the users 516*a-c* participating in the game session are displayed. The users 516*a-c* may be visually identified, for example, according to a username or alias stored in the user data 162 of the game object 160. Alternatively, the users 516*a-c* may be visually identified according to a username, alias, or other identifier received from the identity server 170. The connection status of the users may also be indicated in the users area 514. For example, one or more of the users 516*a-c* that are disconnected from the game session may be greyed out in the users area 514.

The interface 500 may further include an interactive element 520 to add a user to the game session. With additional reference to FIG. 6, upon activation of the interactive element 520 to add a user, a pop-up window 610 is displayed that prompts the present user to provide a user identifier of the user to add to the game session. The user identifier may be entered in the interactive space 612 in the pop-up window 610. The entered user identifier may subsequently be provided to the identity server 170 to receive back one or more attributes, including a connection attribute, which may be used to connect the terminal 110, 120, 130 associated with that user to the game session.

As discussed above, the connection of additional terminals 110, 120, 130 and/or users to the game session may be effectuated by sending an invitation to that terminal 110, 120, 130. For example, an invitation may be sent to the second terminal 120 after the user on the first terminal 110 enters the user identifier associated with the, second terminal 120 in the interactive space 612 of the pop-up window 610. With additional reference to FIG. 7, which shows the interface 500 of the instance of the multiplayer gaining application executing on the second terminal 120, an invitation window 710 may be displayed on said interface 500 inviting the user to join the first terminal 110 user's game session. An interactive element 712 may be provided in the invitation window 710 to accept the invitation and an interactive element 714 may also be provided in the invitation window 710 to decline the invitation. If the user of the second terminal 120 accepts the invitation, the second terminal 120 may then be connected to the first terminal 110 and that user may be joined to the game session.

Returning to FIG. 5, the interface 500 may further include an interactive element 518 to cause the game object 160 to be updated with the current state of the game, as described in greater detail above. The interactive element 518 is not necessarily present or active in each instance of the multiplayer gaming application. For example, only the interface 500 of the instance of the multiplayer gaming application executing on the first terminal 110 may include an activate-able interactive element 518 to update the game object 160, while the interactive element 518 in the interfaces 500 of the instances of the multiplayer gaming, application executing on the second and third terminals 120, 130 may not be configured for interaction or may be absent altogether.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A method comprising:
    executing a multiplayer gaming application on a first terminal, the first terminal being associated with a first user;
    accessing a game object stored on a content management server that contains data representing a state of a previously adjourned session of the multiplayer gaming application;
    determining, from the game object, a connection attribute of a second terminal associated with a second user;
    hosting, by the first terminal, a session of the gaming application between the first terminal and the second terminal via a connection facilitated by the connection attribute;
    updating the game object; and
    sending data of the updated game object to the content management server reflecting an updated state of the session.

2. The method of claim 1, wherein the game object is received from a user account of the content management server associated with at least one of the first user and the second user.

3. The method of claim 2, further comprising, when the game object contains a unique identifier of the second user:
    providing the unique identifier of the second user to an identity server; and
    receiving, from the identity server, the connection attribute relating to the second terminal, wherein the hosting the session between the first terminal and the second terminal is based at least in part on the connection attribute.

4. The method of claim 3, wherein the unique identifier comprises at least one of a phone number, an email address, and a user name.

5. The method of claim 3, further comprising:
    receiving, from the identity server, an alternate identifier of the second user; wherein the second user is identified in an interface of the multiplayer gaming application by the alternate identifier received from the identity server.

6. The method of claim 2, wherein the updating the game object comprises:
    updating, by the first terminal, the game object to reflect a current state of the session.

7. The method of claim 6, further comprising:
    uploading, by the first terminal, the updated game object to the user account of the content management server.

8. The method of claim 6, wherein the updating the game object is performed responsive to a trigger comprising at least one of: an end of a game level, an end of a game map, an end of a game round, an end of a game turn, and an passage of a pre-specified period of time.

9. The method of claim 6, wherein the game object comprises communication data representing one or more messages exchanged between the first user and the second user in the previously adjourned session of the multiplayer gaming application.

10. The method of claim 1, wherein the hosting the session between the first terminal and the second terminal comprises:
    sending, by the first terminal, an invitation to the second terminal for the second user to join the session.

11. The method of claim 1, wherein the connection attribute is a terminal identifier.

12. A method comprising:
executing a multiplayer gaming application on a first terminal, the first terminal being associated with a first user;
creating, by the first terminal, a game object that contains data representing a state of a session of the multiplayer gaming application;
determining a connection attribute of a second terminal from an identifier relating to a second user associated with the second terminal;
using the connection attribute, hosting, by the first terminal, a session between the first terminal and a second terminal;
updating the game object; and
storing the updated game object on a content management server reflecting an updated state of the session.

13. The method of claim 12, wherein the identifier relating to the second user is received from an identity server in response to the first terminal providing a unique identifier to the identity server.

14. The method of claim 13, wherein the identifier relating to the second user comprising a connection attribute relating to the second terminal, and wherein the hosting the session between the first terminal and the second terminal is based at least in part on the connection attribute.

15. The method of claim 12, wherein the identifier relating to the second user is accessed from a directory of phone contacts on the first terminal.

16. The method of claim 12, wherein the updating the game object comprises:
updating, by the first terminal, the game object to reflect a current state of the session.

17. The method of claim 16, further comprising:
uploading, by the first terminal, the updated game object to a user account of the content management server associated with at least one of the first user and the second user.

18. The method of claim 12, wherein the hosting the session between the first terminal and a second terminal comprises:
sending, by the first terminal, an invitation to the second terminal for the second user to join the session.

19. A method comprising:
executing a multiplayer gaming application on a first terminal, the first terminal being associated with a first user;
providing, by the first terminal, a unique identifier to an identity server, the unique identifier relating to a second user;
receiving, by the first terminal and from the identity server, a connection attribute relating to a second terminal associated with the second user; and
based at least on the connection attribute, hosting, by the first terminal, a session of the multiplayer gaming application between the first terminal and the second terminal.

20. The method of claim 19, further comprising:
receiving, by the first terminal and from the identity server, a second attribute relating to the second user, wherein the second user is identified in an interface of the multiplayer gaming application based on the second attribute.

21. The method of claim 19, wherein the session between the first terminal and the second terminal is established via a short-range radio protocol.

* * * * *